Dec. 16, 1958     T. F. VOLLTEN     2,864,199
FISHING ACCESSORY
Filed Oct. 2, 1956
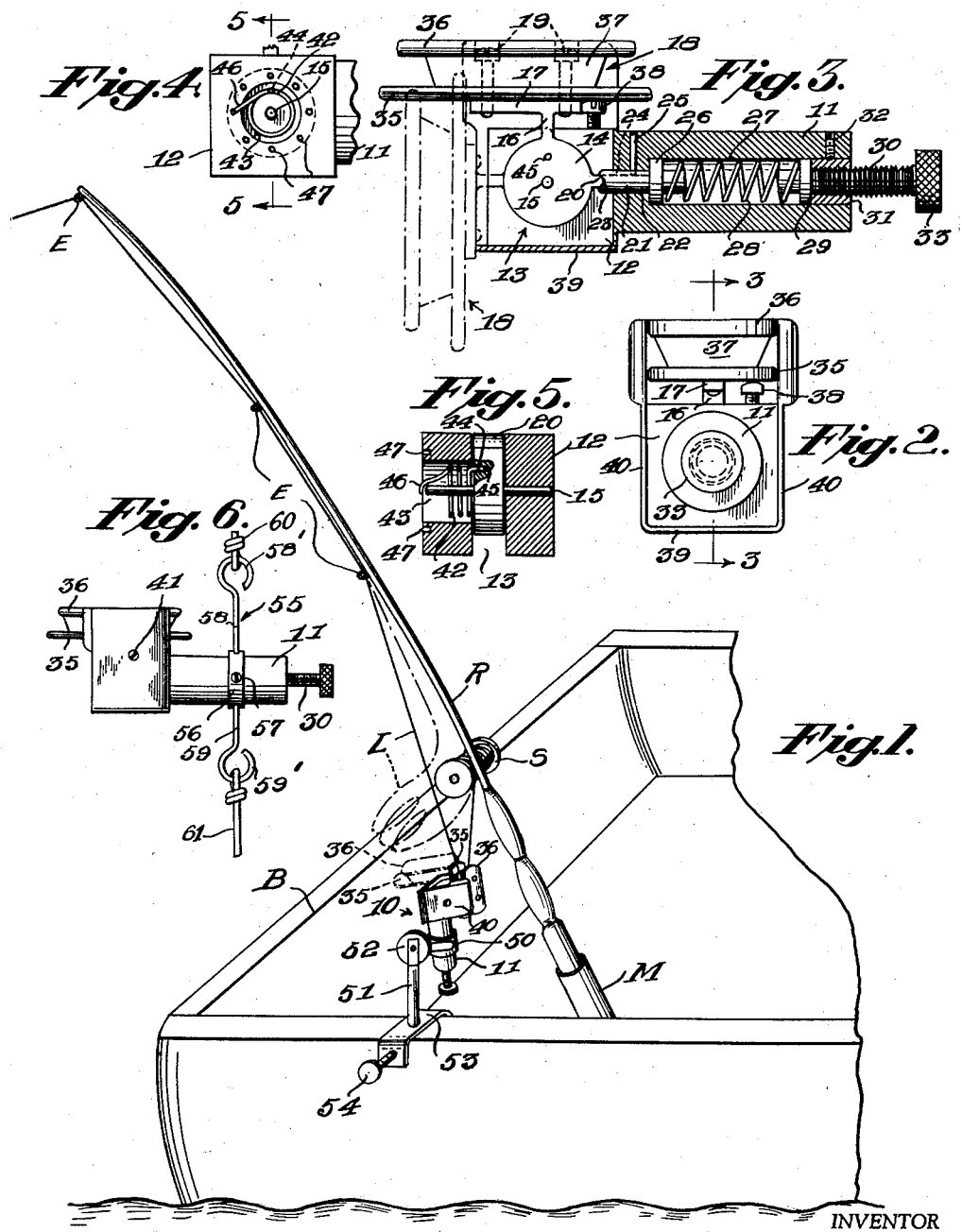
INVENTOR
Theodore F. Vollten
BY
ATTORNEY United States Patent Office 2,864,199
Patented Dec. 16, 1958

2,864,199

FISHING ACCESSORY

Theodore F. Vollten, Bethesda, Md.

Application October 2, 1956, Serial No. 613,399

11 Claims. (Cl. 43—43.11)

This invention relates to a fishing accessory.

As is generally known by those familiar with the fishing art, game fish strike the bait, whether the same be artificial or alive, with the object of stunning the bait and thereafter when the bait is motionless swallow the same. However, if the end of the line to which the bait is secured is in motion, as is the case in trolling, the bait is not motionless regardless of the impact of the strike.

It is accordingly a primary object of the invention to provide an accessory for operative association with a reel supported on a fishing rod whereby a normally stationary length of line between the reel and the bait is automatically released upon a fish striking the bait and which released length of line provides for movement of the fishing rod for a substantial distance without pulling on the bait attached end of the line whereby same remains at rest for swallowing of the bait by the fish.

Further, if the bait or lure is hung on a submerged object while trolling, the supply of extra fishing line on the spool when tripped by this accessory, prevents the fishing line from being broken.

A further object of the invention is the provision of an accessory for the above noted purpose which is in the form of an attachment which is releasably supported on either the gunwale or the outrigger of a boat.

Other objects and advantages of the invention will become apparent in the course of the following detailed description, taken in connection with the accompanying drawing, wherein:

Fig. 1 is a perspective view showing the gunwale portion of a boat having a fishing rod operatively attached thereto and further showing the reserve line attachment mounted on the boat and in operative association with the fishing rod and a reel supported thereby.

Fig. 2 is an end elevational view of the attachment as observed from the right of Fig. 3.

Fig. 3 is a vertical longitudinal sectional view as observed in the plane of line 3—3 on Fig. 2, with certain elements of the attachment in elevation.

Fig. 4 is a fragmental elevational view as observed from the left of Fig. 5.

Fig. 5 is a vertical sectional view as observed in the plane of line 5—5 on Fig. 4.

Fig. 6 is a reduced side elevational view of the attachment provided with means for securing same to the outrigger of a boat.

Referring now in detail to the drawing, the gunwale portion of a boat is indicated at B and which boat is as in usual practice provided with an outrigger (not shown).

The boat B is provided with means M in which the butt end of a fishing rod R is removably supported and which rod is provided with a line L extending from a supply reel S and guided through eyes E on the rod and the free end of the line is adapted for attachment of a lure or bait.

While in usual practice the line L extends directly from the reel S to the lure or bait. The present invention comprises a reserve line attachment 10 disposed between the reel and the lure or bait and which includes an elongated spool having a length of the line wound thereon and which is rendered available upon a fish striking the lure or bait in a manner later to appear.

The baited end of the fishing line is hereinafter referred to as the free end of the fishing line.

The said attachment comprises a cylindrical member 11 having one end thereof unitary with a block 12 which is provided with a slot 13 opening through the top, bottom and front end thereof, as is clearly indicated in Figs. 3 and 5.

A disc 14 is rotatably supported in said slot 13 by means of the shaft 15. The disc 14 is provided with a bracket including a radial arm 16 rigid with the disc and a bar 17 at right angles thereto and which in normal position is disposed above and parallel with the top of block 12 as indicated in Fig. 3.

An elongated reserve line spool 18 is rigidly secured to the bracket bar 17 as by means of a pair of screws 19. The spool 18 is adapted for movement to and from the solid and dotted line positions in Fig. 3, as will later appear and for this purpose the disc 14 which is rigid with the spool 18 is provided with a trigger 20 in the form of a radial projection having a rounded camming end and means is provided for co-operation with said trigger for holding the disc 14 and spool 18 in the solid line position in Fig. 3.

Such means comprises a sear 21 which is cylindrical and mounted for reciprocation in a bore 22 in the member 11 adjacent the slot 13.

The inner or free end of the sear is provided with a camming notch 23 for co-operation with the camming end of the trigger 20 and in order to prevent rotation of the sear in the bore 22 same is provided with an axial groove 24 into which projects the inner end of a pin or screw 25 extending radially into the member 11.

The sear 21 is provided with a cylindrical head 26 disposed within a relatively large bore 27 in member 11 axially thereof and the said head is normally maintained in contact with the adjacent end wall of said bore by means of a coil spring 28 disposed within and extending lengthwise of the bore, one end of the spring engaging the said head 26 and the opposite end of the spring engages a cylindrical follower 29 axially movable within the bore and which under the action of the spring engages the inner end of a screw 30 which is threaded through a tapped sleeve 31 retained in the opposite otherwise open end of the bore by means of a screw 32.

The screw 30 is provided with a knurled manipulating head 33.

The spring 28 maintains the head 26 in contact with the end wall of the bore 27 but upon adjustment of the screw 30, the resistance to movement of the sear 21 inwardly of the bore is varied with a corresponding variation of the interlock between the trigger 20 and the sear 21.

The spool 18 comprises a pair of elongated plates including an inner one 35 and an outer one 36 with the former being longer than the latter with its ends projecting equally beyond the ends of the latter. The plates 35 and 36 are in laterally spaced parallel relation and disposed between same is a line receiving core 37 which is preferably beveled inwardly from plate 36 to plate 35 and screws 19 hold the plates and core in assembled position.

The spool 18 is shown in its excess line retaining position in solid lines in Fig. 3 and in its excess line dispensing position in dot-and-dash lines in the same figure.

The block 12 is preferably provided with a screw 38 whose head is engaged by plate 35 for limiting clockwise rotation of the spool from the dot-and-dash line position for accurate interlock of the trigger 20 with the yieldable sear 21.

The block 12 is preferably provided with a casing including a bottom wall 39 and opposite side walls 40 and the casing is removably secured to the block by screws, one of which is indicated at 41 in Fig. 6.

The casing walls project from the block 12 in a direction opposed to the cylindrical member 11 a distance such that the bar 17 engages an edge of the bottom wall 39 when the spool 18 is rotated counter-clockwise to the excess line dispensing position, indicated by dot-and-dash lines in Fig. 3, and the spool in its line dispensing position is at right angles to its line retaining position as is clearly indicated in Fig. 3.

Means are provided for urging the spool to its line dispensing position and for yieldably holding same in such position. Said means preferably comprises a spiral spring 42 disposed within a cylindrical walled cavity 43 opening through one wall of block 12 and also opening into the slot 13 and in which cavity one end of shaft 15 is centrally disposed.

Said spring 42 has an angular extension 44 on its inner end which is received in a recess 45 in the adjacent side wall of disc 14 and the outer end of the spring is provided with an extension 46 having an angular end which is selectively engageable in one of the several recesses 47 in the side wall of the block and which recesses are disposed circumferentially of the cavity 43.

By the above construction, the spring 42 is capable of having its tension adjusted for variable urge on the disc 14 in opposition to the retaining action of the coil spring 28.

The attachment is securable to the gunwale of the boat B by means of a suitable clamp which in a satisfactory embodiment thereof comprises a sleeve 50 for adjustably receiving the cylindrical member 11 and such sleeve is secured to an upright 51 through the intervention of a serrated adjustable device 52 whereby the attachment may be adjusted to different angular positions relative to the fishing rod R. The said upright 51 is rigid with an inverted U-shaped clamp plate 53 into one leg of which is threaded a boat engageable bolt 54.

The improved attachment is equally applicable to the outrigger of a boat and for such purpose a member 55 is provided for removable and adjustable connection with the outrigger hoist line of the boat.

Thus, as indicated in Fig. 6, the member 55 includes a sleeve 56 which is engageable over the cylindrical member 11 and same is provided with a screw 57 for frictional contact with the member 11 for holding the sleeve in any axial adjusted position on the member.

A pair of arms 58, 59 project from said sleeve at opposite ends of a diameter thereof and said arms terminate in eyes 58' and 59' respectively to which are secured adjacent ends 60 and 61 of an interrupted outrigger hoist line.

Having set forth the construction of the apparatus, the operation thereof is as follows:

As observed in Fig. 1, the line L normally extends from a supply thereof on the reel S, and a substantial reserve length of the line adjacent the reel is wound upon the spool 18 from which the line extends through the eyes E on the rod R and which at its free end is provided with a lure or a bait.

It is here to be observed that the line from the reel is disposed adjacent the shorter plate 36 while the line extending from the spool is disposed adjacent the longer plate 35 and at an angle thereto whereby upon a fish striking the bait, pressure of the line on the end of plate 35 trips the spool against the action of spring 28 whereafter the spiral spring 42 acts to move the spool to the line dispensing position indicated in dot-and-dash lines and in which position, wherein the spool is disposed substantially normal to the line, the reserve length of line is released from the spool.

The dispensed length of line is indicated in exaggerated form in Fig. 1, it being understood that such length is gradually taken up upon relative movement between the rod and the bait. Such reserve length of line does, however, provide for substantial relative movement between the rod and the bait whereby the latter remains at rest for a sufficient time to be swallowed by a fish subsequent to a striking action.

Of course the amount of fishing line wound on the spool limits the amount of slack fishing line that is released from the spool, and the amount of fishing line that can be wound on the spool depends on the size of the spool and the thickness of the fishing line.

What I claim and desire to secure by U. S. Letters Patent is:

1. A fishing accessory disposable between a thread supply on a fishing rod and the baited free end of a line extending from said supply, said accessory comprising a spool for a winding of a reserve length of the line thereon and constituting the sole support for said reserve length of line, means pivotally supporting said spool for movement from a normal line retaining position to a line releasing position and vice versa, and said spool in its line retaining position being inclined to the line extending therefrom and including a line engaging member for moving said spool to said line releasing position upon tension in the line extending from said spool to the baited free end thereof.

2. A fishing accessory adapted for interposition between a line supply and a baited free end thereof, said accessory comprising a support having a spool pivotally supported thereby, catch means normally retaining the spool in a position generally parallel with said line with a length of the line wound thereon, said spool constituting the sole support for said length of line wound thereon and said spool including means engageable by the line when under tension by fish striking at the bait for swinging the spool against said catch means to a position generally perpendicular to the line for release of the wound line thereon for the purpose set forth.

3. A fishing accessory for operative association with a fishing rod provided with a reel having a line extending therefrom, comprising a block adapted for rigid support adjacent said reel, a spool pivotally supported by said block including a pair of spaced parallel plates, yieldable detent means for normally holding said spools in a position wherein the plates are generally parallel with the line, said spool adapted to have a length of the line wound thereon with one strand thereof being engageable with an end of one of said plates under tension of the line for swinging said spool to a position wherein said plates are substantially normal to the line whereby the wound length of line thereon is released for the purpose set forth.

4. A fishing accessory of the character described and for the purpose set forth, comprising a cylindrical member adapted for support adjacent a line supply on a fishing rod, a block on one end of the member having a medial slot therein, a disk disposed in said slot and pivotally supported by said block, an excess line supporting spool rigid with the disk and disposed normal to a radius thereof, yieldable detent means for releasably holding said spool in one position for retention of a wound length of the line thereon, means on said block for limiting movement of the spool to a line releasing position upon rotation of the spool through an angle of 90° and spring means for assisting movement of said spool to said line releasing position upon release of the detent means.

5. The structure according to claim 5, wherein said detent means comprises a trigger projecting radially from the periphery of said disk, said cylindrical member having a bore in which is disposed a sear having a recessed end engageable by said trigger, said member having a second and larger bore co-axial with said first bore and an elongated coil spring in said second bore having one end thereof engaged with said sear for normally holding same in yieldable engagement with said trigger.

6. The structure according to claim 5, together with an adjusting screw threaded into the other end of said cylindrical member and being engaged with the opposite end of said spring for varying the tension therein.

7. The structure according to claim 4, wherein said block is provided with a recess opening through one side wall thereof and into said slot, said spring means comprising a spiral spring disposed in said recess and having one end thereof engaged with said disk and the other end thereof engaged with said block.

8. The structure according to claim 7, wherein said side wall of the block is provided with a series of circumferentially disposed recesses for selective reception of said other end of the spiral spring for adjusting the tension therein.

9. The structure according to claim 4, together with a boat engageable bracket having means for supporting said cylindrical member in variable angular positions.

10. The structure according to claim 4, together with means engageable with said cylindrical member for supporting same from an outrigger hoist line of a boat.

11. The structure according to claim 3 in which the spaced parallel plates forming the side wall of the spool are of different size.

References Cited in the file of this patent

UNITED STATES PATENTS

| | | |
|---|---|---|
| 2,457,715 | Pazzano | Dec. 28, 1948 |
| 2,605,570 | Abrey | Aug. 5, 1952 |
| 2,730,832 | Mathers | Jan. 29, 1954 |

FOREIGN PATENTS

| | | |
|---|---|---|
| 145,991 | Sweden | June 29, 1954 |